US008341528B2

(12) United States Patent  
Chaudhary et al.

(10) Patent No.: US 8,341,528 B2  
(45) Date of Patent: Dec. 25, 2012

(54) MANAGING THE CONTENT OF SHARED SLIDE PRESENTATIONS

(75) Inventors: Dhananjay R. Chaudhary, Fremont, CA (US); Tara U. Roberts, Austin, TX (US); Joseph E. Keslin, Munster, IN (US); Philip Boutros, Long Grove, IL (US)

(73) Assignee: Oracle International Corporation, Redwood Shores, CA (US)

( * ) Notice: Subject to any disclaimer, the term of this patent is extended or adjusted under 35 U.S.C. 154(b) by 467 days.

(21) Appl. No.: 12/494,773

(22) Filed: Jun. 30, 2009

(65) Prior Publication Data

US 2010/0114985 A1     May 6, 2010

Related U.S. Application Data

(60) Provisional application No. 61/111,603, filed on Nov. 5, 2008.

(51) Int. Cl.  
*G06F 3/00* (2006.01)
(52) U.S. Cl. .................... 715/732; 715/731; 715/730
(58) Field of Classification Search .................. 715/732, 715/730, 731  
See application file for complete search history.

(56) References Cited

U.S. PATENT DOCUMENTS

| 7,085,770 | B2 | 8/2006 | Bennett, Jr. et al. | |
|---|---|---|---|---|
| 7,788,486 | B2 | 8/2010 | Miller et al. | |
| 7,873,652 | B1 | 1/2011 | Hill | |
| 2005/0091579 | A1* | 4/2005 | Mewherter et al. | 715/513 |
| 2005/0160375 | A1 | 7/2005 | Sciammarella et al. | |
| 2006/0036568 | A1 | 2/2006 | Moore et al. | |
| 2006/0218004 | A1* | 9/2006 | Dworkin et al. | 705/1 |
| 2006/0294046 | A1* | 12/2006 | Sareen et al. | 707/1 |
| 2006/0294469 | A1 | 12/2006 | Sareen et al. | |
| 2007/0294612 | A1* | 12/2007 | Drucker et al. | 715/500.1 |

FOREIGN PATENT DOCUMENTS

EP     1 148 412 A2     10/2001

\* cited by examiner

*Primary Examiner* — Omar Abdul-Ali  
(74) *Attorney, Agent, or Firm* — Squire Sanders (US) LLP

(57) ABSTRACT

Systems, methods, and software applications for managing slide presentation content are described in the present disclosure. According to one embodiment, among many, a computer readable medium is configured to store instructions that are executable by a processing device. The computer readable medium comprises logic adapted to disassemble a plurality of slide presentations into a plurality of individual files, wherein each individual file corresponds to a single slide of a respective slide presentation. The computer readable medium also includes logic adapted to extract information from each slide and logic adapted to compare the extracted information from each slide and consolidate groups of slides that are substantially similar.

29 Claims, 10 Drawing Sheets

MANAGING THE CONTENT OF SHARED SLIDE PRESENTATIONS

CROSS-REFERENCE TO RELATED APPLICATIONS

This application claims the benefit under 35 U.S.C. 119(e) of U.S. Provisional Application No. 61/111,603, filed Nov. 5, 2008.

TECHNICAL FIELD

The present disclosure generally relates to presentation software applications for creating and displaying slide presentations. More particularly, the embodiments described herein relate to systems and methods for searching previously stored presentation content and for assembling new slide presentations.

BACKGROUND

Presentation software, such as PowerPoint® from Microsoft Corporation, is used for inserting text and graphics onto individual slides to create slide presentations. Presentation software can be run on a regular desktop or laptop computer, making the creation of slide presentations convenient and simple. Once prepared, a slide presentation can be displayed for an audience using a video projector, for example, and is shown to the audience one slide at a time, sometimes using transitional effects between slides. The nomenclature for the term "slide" is carried over from previous technologies for creating presentations that project images through 35 mm slides positioned within a slide projector.

Slide presentations are typically used for visually communicating information during a speech or presentation. Slide presentations can be used for purposes relating to business, education, entertainment, etc. Some benefits of utilizing slide presentations include helping the speaker follow an outline of a speech and also providing visual information that can help the audience follow the main points of the speech.

Typically, in order to create a slide presentation, a user might need to access a file system associated with the business with which the user is employed, download presentations that may have been saved on the file system, search for relevant content on the Internet or other networks, etc. After gathering information from various sources, the user may realize that the content might not be useful for the user's particular purpose. Although some information downloaded from an organization's network might be useful for one purpose, such as for a presentation to an audience of sales directors in the United States, the same information might not be so useful for other purposes, such as for a presentation to an audience of engineers in Asia.

SUMMARY

The present disclosure describes several embodiments of systems, methods, and processing logic for managing presentation content. Regarding one particular embodiment, a computer readable medium, which is configured to store instructions that are executable by a processing device, includes logic adapted to disassemble a plurality of slide presentations into a plurality of individual files. Each individual file corresponds to a single slide of a respective slide presentation. The computer readable medium also includes logic adapted to extract information from each slide. In addition, the computer readable medium includes logic adapted to compare the extracted information from each slide and consolidate groups of slides that are substantially similar.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
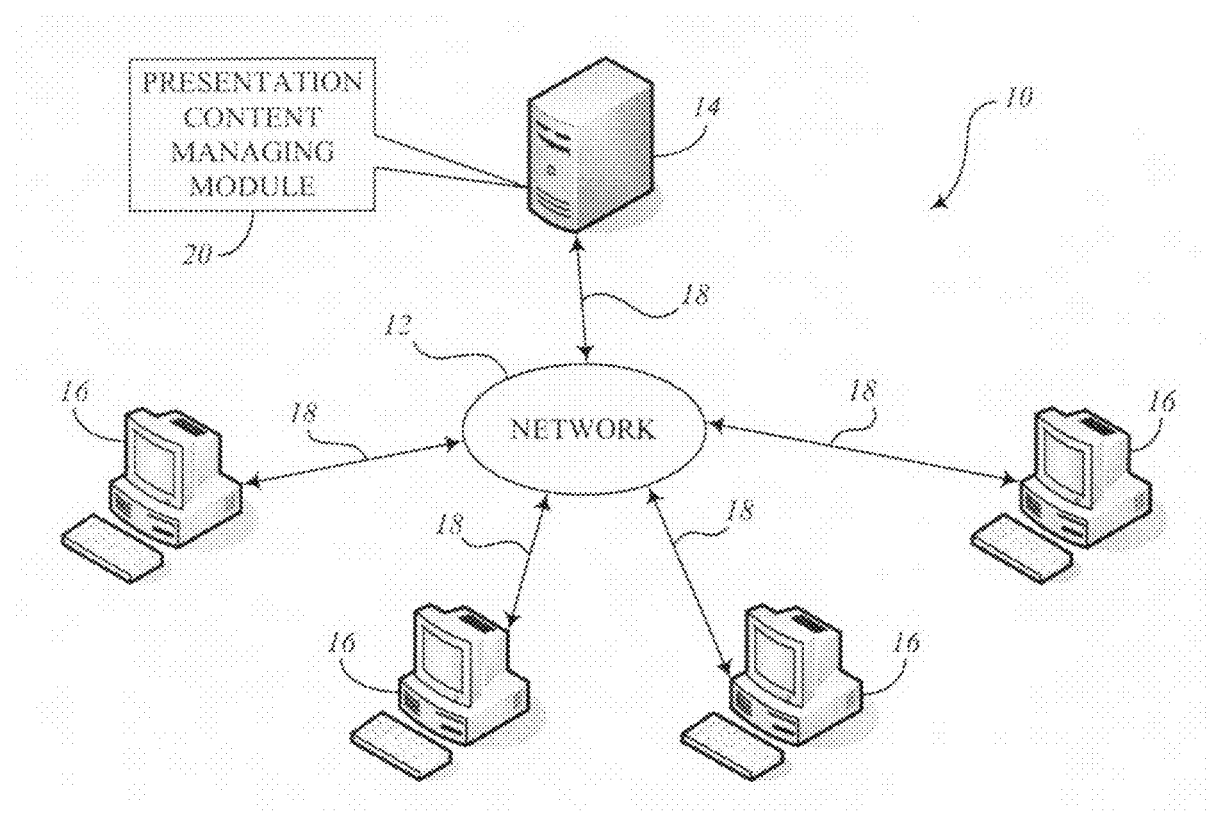
FIG. 1 is a diagram illustrating a presentation content managing system according to one embodiment.

When creating a slide presentation, a user may need to access information from various sources. Not only can researching and gathering relevant information for the presentation be time consuming, but sifting through a great amount of information to determine what information is relevant can be time consuming as well. After this, the user may spend a large amount of time actually creating a slide presentation, especially if the user does not have much experience in this regard.

In order to improve the processes for creating a slide presentation compared to conventional preparation techniques, the embodiments of the present disclosure comprise the establishment of a centralized system that allows sharing of slide presentation content within an enterprise, company, organization, or other group. The present disclosure streamlines the process of creating new slide presentations by tapping into the collective experience of the organization. When a successful presentation is created, that success can then be shared, replicated, and enhanced by everyone in the organization. Thus, the benefits of utilizing the presentation content managing system described herein can then be multiplied throughout the organization.

Even though a vast repository of presentation content can be made available to users, it may still be difficult for a user to determine the significance or usefulness of certain slide presentations. However, with a centralized content sharing system, a user can conduct a text search to find content within slides that other members within the organization have shared. Also, the user can access comments and ratings that others have provided for slides that are revealed during the search. The user can easily review the previously submitted comments and rating, which can help the user determine the relevance of the presentation content for the user's purposes and help hone in on the most effective slides and presentations. Therefore, the user has quick access to recently prepared presentations to stay up-to-date on the latest presentations that have been shared by peers.

In some embodiments, the user can access and assemble any number of the shared slides in a remote database associated with a centralized server. During assembly, multiple masters are leveraged as needed in order to maintain the formatting of every slide copied into the new document. Once the slides are assembled, the slides can be downloaded to the user's computer. In addition, the user can download an entire presentation if desired. At this point, the user can edit or enhance the downloaded content according the user's needs using conventional presentation software processing means.

When the user has completed a new presentation, the user can upload the presentation into the server's database, allowing the content from the new presentation to be available to others. Regarding the upload process, an enterprise may consist of a number of enterprise social networks (ESNs), which include groups of members within the enterprise having specific interests or goals, such as, for example, groups dedicated to insurance, groups dedicated to manufacturing, groups dedicated to engineering, etc. Thus, slide presentations may be shared in one or more ESNs, depending on the particular content of the slide presentations. To share the content, a user can upload the presentation onto the relevant ESNs, which may be similar to a publish operation within social networks.

The central server is configured to receive the uploaded slide presentations. When the centralized presentation system is first established, the server can receive multiple presentation files and organize those files as mentioned herein. Particularly, the server disassembles each presentation into a set of single slide presentations, which can be accessed separately by other users during the search process. The disassembly feature allows a presentation file to be divided up into a discrete set of component slides for storage and retrieval.

In addition, multiple files can be created for each slide. For example, a "fingerprinting" process can be used to extract information and define each slide in a number of ways. A first file, for instance, can be created to define the slide according to the text within the slide. Another may be created to capture a thumbnail image of the slide, which can be displayed among the search results. Also, graphical information of the slide can be extracted and used for comparison purposes in order that slides that share many similarities can be considered as being identical.

This system is configured to detect and copy the slide content, formatting, and any document wide resources leveraged by the slide and store this information into new presentation files. Much of the slide content and formatting includes text boxes, shapes, word art, images, objects, colors, transition, etc. This content and formatting is supported and preserved during the copying process. There may be numerous document wide resources used across multiple slides, including, for example, fonts, images, object linking and embedding (OLE) information, sounds, video, slide masters, speaker notes, etc. In order to minimize the resulting document size, only the resources and masters that are referenced or leveraged by the slides are copied into the new document.

Duplicate slides, including slides that are very similar in many respects, can be grouped or consolidated. Then, during the display of the search results, the duplicates can be displayed as one slide. In this way, the user will not be overwhelmed by a display of multiple copies of duplicate slides.

During assembly, multiple masters are leveraged as needed in order to maintain the formatting of every slide copied into the new document. Each master is effectively fingerprinted in order to avoid duplicating masters that are in fact identical across a set of merged presentations. The original masters are maintained during assembly and the final presentation is allowed to be reformatted within the presentation software by the user, applying any desired set of masters should reformatting be required.

Fingerprinting is a feature that analyzes an input document during extraction and generates electronic fingerprints that uniquely identify specific document characteristics. This allows search technology to find documents with similar characteristics by comparing the fingerprints among a set of documents. Fingerprints are provided in one embodiment as a 128 bit md5 hash code making comparison very fast while limiting the cost of storage. The system can also generate three types of fingerprints when processing the slide presentation documents—slide content, slide appearance, and graphic data fingerprints, as is explained in more detail below. Each can be used to find similarities among slides from different presentations in order to narrow down the set of matches found during a search.

According to the embodiments herein, other members of an ESN can therefore easily leverage the content that has been published and stored with respect to the particular ESN. Also, users can perform a text search, browse through individual slides that contain the specific key words, view the comments and rating associated with the slides to help determine if a particular slide might be appropriate for the user's purposes, assemble or copy slides that may be needed, and download slides or presentations. The user can also upload a new presentation and thereby continue the process for managing the shared presentation content.

FIG. 1 is a diagram illustrating an embodiment of a presentation content managing system 10 according to one implementation. In this embodiment, presentation content managing system 10 includes a network 12 for enabling communication among a server 14 and end-user devices 16 via communication channels 18. Network 12 and communication channels 18 may include any suitable combination of switches, relays, transmission lines, wireless communication channels, etc., for allowing data and information to be exchanged. In particular, data can be uploaded from an end-user device 16 to server 14 and downloaded from server 14 to an end-user device 16.

Furthermore, server 14 is associated with presentation content managing module 20. In this respect, server 14 may include internal memory or be in communication with external memory for storing presentation content managing module 20. In addition, this memory associated with server 14 may also be configured to store the actual presentation content being managed. The presentation content includes slide presentations prepared by one or more users of presentation content managing system 10 and may also include other information related to the presentation content. Presentation content managing module 20 may be configured in hardware, software, firmware, or any combination thereof. In particular, presentation content managing module 20 is configured to gather presentation content. With the content, presentation content managing module 20 disassembles the slide presentations into individual slides, creates files defining specific fingerprint or signature information about the slides, and performs a de-duplication process on identical slides.

When the slides are prepared in this fashion, presentation content managing module 20 is further configured to provide search functionality to allow users to conduct text searches, or key word searches. Presentation content managing module 20 can also store and manage comments, reviews, tags, key words, ratings, etc., that are associated with the respective slides. In some cases, users can add comments or ratings, which is aided by presentation content managing module 20. Furthermore, presentation content managing module 20 can download individual slides or an entire presentation upon request and enables the user to upload new slide presentations that the user creates. When these new presentations are uploaded, presentation content managing module 20 can perform the disassembly, fingerprinting, and de-duplication processes as mentioned above on the new presentations to make these new slides available for other users as well.

Server 14 may be a computing system, such as a computer, data processing system, or other suitable electronic device for executing logic instructions, e.g., software applications. A processing device may be incorporated within server 14 for controlling the functions of server 14. The processing device may be a general-purpose or specific-purpose processor or microcontroller.

The embodiments of presentation content managing module 20 described in the present disclosure can be implemented in hardware, software, firmware, or a combination thereof. When implemented in software or firmware, presentation content managing module 20 can be stored in a database associated with server 14 and executed by the processing device associated with server 14. Alternatively, when implemented in hardware, presentation content managing module 20 can be implemented in the processing device using discrete logic circuitry, an application specific integrated circuit (ASIC), a programmable gate array (PGA), a field programmable gate array (FPGA), or any combination thereof.

Figure 2:
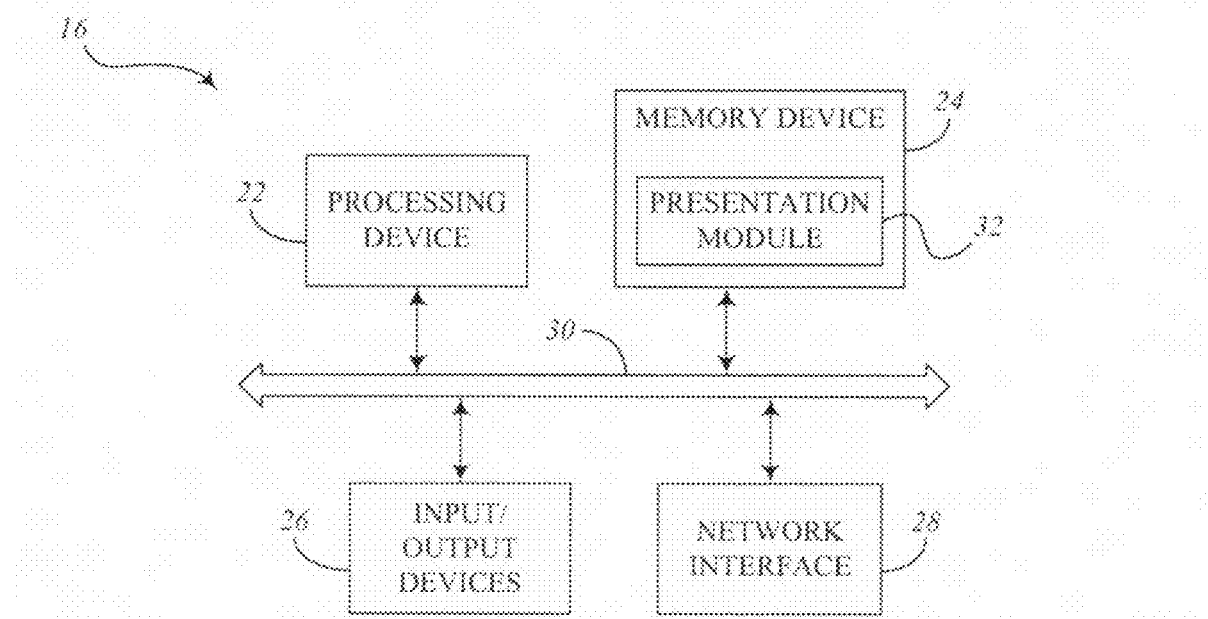
FIG. 2 is a block diagram illustrating one of the end-user devices shown in FIG. 1, according to one embodiment.

FIG. 2 is a block diagram illustrating an embodiment of one of the end-user devices 16 shown in FIG. 1, according to one implementation. In this embodiment, end-user device 16 includes a processing device 22, memory device 24, input/output devices 26, and network interface 28, each interconnected via a bus 30. Network interface 28 enables communication between end-user device 16 and server 14 via network 12. Memory device 24 contains, among other things, presentation module 32, which may include regular presentation software or other logic capable of preparing slide presentations.

End-user device 16 may be a computing system, such as a computer, data processing system, or other suitable electronic device for executing logic instructions, e.g., software applications. Processing device 22 may be a general-purpose or specific-purpose processor or microcontroller. Memory device 24 may include one or more internally fixed storage units, removable storage units, and/or remotely accessible storage units. Also, memory device 24 may include any suitable combination of volatile memory and/or non-volatile memory and can be configured to store information, data, instructions, and/or software code. Input/output devices 26 may include input mechanisms such as keyboards, keypads, cursor control devices, or other data entry devices. The input mechanisms enable a user to enter information or instructions in end-user device 16. Input/output devices 26 may also include output mechanisms, such as computer monitors, display screens, audio output devices, printers, or other peripheral devices for communicating information to the user.

The embodiments of presentation module 32 described in the present disclosure can be implemented in hardware, software, firmware, or a combination thereof. When implemented in software or firmware, presentation module 32 can be stored in memory device 24 and executed by processing device 22. Alternatively, when implemented in hardware, presentation module 24 can be implemented in processing device 22 using discrete logic circuitry, an ASIC, a PGA, an FPGA, or any combination thereof.

Presentation module 32 includes further functionality to allow a user to access previously prepared presentations from server 14. Also, presentation module 32 allows the user to conduct a text search to search for individual slides stored with respect to server 14. Presentation module 32 also allows the user to assemble a number of previously prepared slides to create a new presentation and upload a completed presentation to server 14 in order that the new presentation can be shared.

Presentation module 32 may be configured to operate in conjunction with presentation content managing module 20 (FIG. 1), which is associated with server 14. Presentation module 32, presentation content managing module 20, and other software, computer programs, or logic code that includes executable logical instructions as described herein, can be embodied in a computer-readable medium for execution by any suitable processing device. The computer-readable medium as described herein can include one or more suitable physical media components that can store the software, programs, or code for a measurable length of time.

Figure 3:
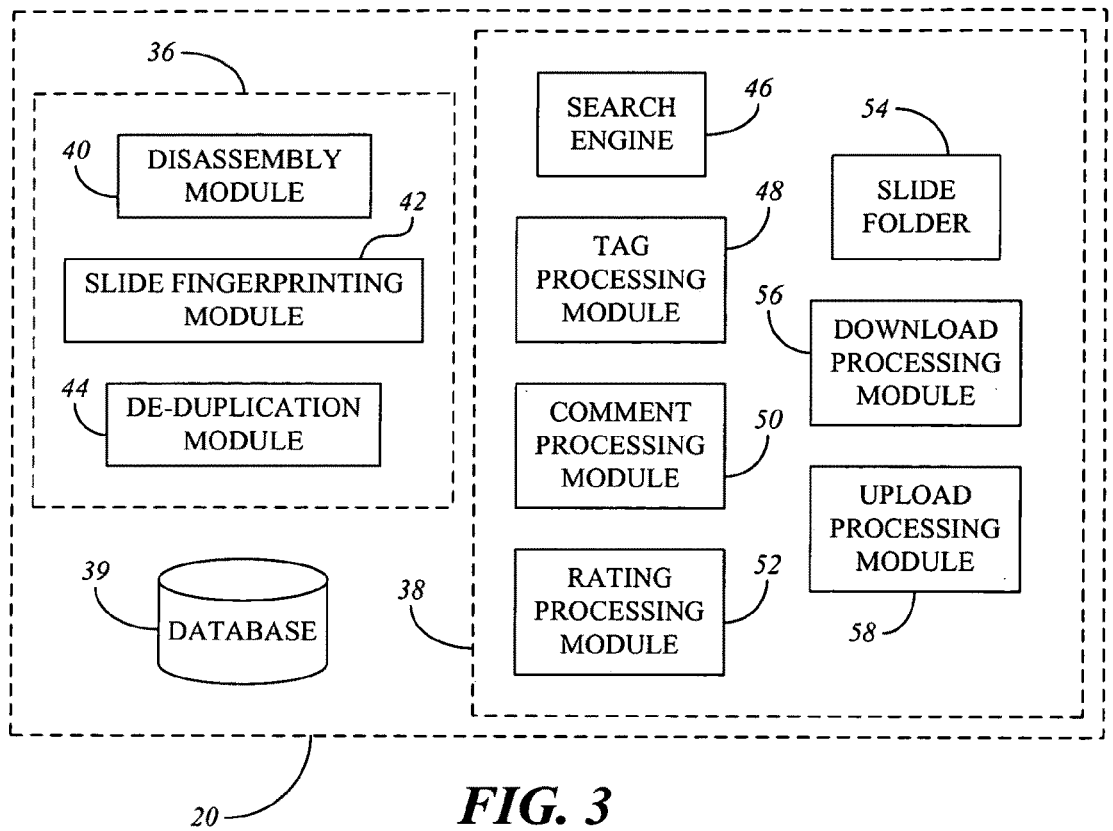
FIG. 3 is a block diagram illustrating the presentation content managing module executed by the server shown in FIG. 1, according to one embodiment.

FIG. 3 is a block diagram illustrating an embodiment of presentation content managing module 20 shown in FIG. 1, according to one implementation. In this embodiment, presentation content managing module 20 includes a slide processing module 36, a user responsive module 38, and a database 39. Slide processing module 36 includes, among other things, a disassembly module 40, a slide fingerprinting module 42, and a de-duplication module 44. User responsive module 38 includes, among other things, a search engine 46, a tag processing module 48, a comment processing module 50, a rating processing module 52, a slide folder 54, a download processing module 56, and an upload processing module 58.

Database 39 may include one or more internally fixed storage units, removable storage units, and/or remotely accessible storage units. Also, database 39 may include any suitable combination of volatile memory and/or non-volatile memory and can be configured to store information, data, instructions, and/or software code. In particular, database 39 is configured to store presentations, individual slides, and information related to the presentations and slides.

When a presentation file is uploaded to server 14, slide processing module 36 operates in the background to prepare the shared file. Disassembly module 40 inspects the presentation files that are stored in database 39. If the presentation file has not yet been processed by slide processing module 36, disassembly module 40 retrieves the presentation file and creates several files, one file for each individual slide. This allows the individual slides to be accessed separately from the rest of the presentation. Disassembly module 40 also stores information for each slide to associate it with the presentation from which it was taken. The separated slides can be stored in database 39.

Slide fingerprinting module 42 extracts certain features from each slide. For instance, slide fingerprinting module 42 can include image processing functionality in order that thumbnail images can be captured for the individual slides. Also, the slides undergo more image processing to create a higher resolution image for rendering the slide on a graphical user interface (GUI). Particularly, the GUI may include a carousel display arrangement that uses the copy of the high resolution images of the slides for display. In another window associated with the GUI, a folder can be shown that includes a display of the thumbnail images of the slides that have been selected by the user. Furthermore, slide fingerprinting module 42 is configured to perform a text extraction process to extract all the text from the slide. The text is then stored separately from the image data files. When a text search is done, the text file for each slide is compared with the search terms to determine the success of the search.

Slide fingerprinting module 42 also creates a fingerprint that can be used to define the slide in a way that can be compared with other slides. A comparison can then be done for determining if a slide is visually similar to another slide or not. The fingerprint is taken in this case by an extraction process for extracting the artifacts, e.g. text box, text, background color, etc., from the slide to create the fingerprint, or signature, for the slide.

De-duplication module 44 includes an algorithm that can determine if one slide looks similar to another slide. For example, if a text box is placed a few pixels over to one side compared to another slide, or if a color is slightly different, the algorithm can make certain calculations to compare the signature of the slides to determine whether or not one slide is substantially comparable to another. The slides that are determined to be duplicates or very similar are grouped together or consolidated. In this way, the grouped slides are considered as a single slide when a search process is being conducted. This grouping process by de-duplication module 44 can help to simplify the search process. Also, duplicate slides can be shown on the GUI as a single slide when the fingerprints or signatures of two or more slides are identical or substantially similar, which helps to minimize the number of hits that a user may have to review.

By comparing the slides, such as by comparing the fingerprints of the slides, de-duplication module 44 can consolidate duplicate slides into a single slide for search purposes. Therefore, instead of rendering multiple duplicate slides in the search results, only a single slide is shown. Also, de-duplication module 44 is configured to store information about each individual duplicate slide, such as the presentation in which the slide appears. Although the user does not have to see duplicates of the same slide, the user still has access to where each slide comes from, if the user needs that information. Furthermore, the comments and ratings for each individual slide are kept separate for each duplicate since the use of a duplicate slide in a particular presentation may affect the relevance of that slide. In other words, a duplicate slide might be useful in one context, but not very useful in another context.

Another thing to consider in this regard is that when a slide goes through a number of edits throughout an enterprise and different versions of the slide are created with only minor changes, it may be difficult to determine from certain information if a slide is a duplicate, even though it might be visually identical. The algorithms associated with de-duplication module 44 can dismiss things that might only change the visual aspects of the slide in a minor way.

De-duplication module 44 can use any comparison algorithms for determining if two or more slides, or the fingerprints of these slides, are identical. For example, the formatting information of the slides can be compared. In some cases, the text file of the slides can be compared. In some other cases, the key words used as tags can be compared. In still other cases, the graphical information of the slides can be compared. Any combination of one or more of these or other comparison or fingerprinting methods can be used by de-duplication module 44 to match certain slides with slides that are duplicates or substantially similar. De-duplication module 44 can also attach information about duplicate slides in order that when search results are displayed, each individual slide can be accessed if needed.

As an example of the use of de-duplication module 44, suppose that the employees of a company have created several slide presentations that are uploaded and stored in database 39. The company may have certain slides that are common to all the presentations, such as header slides, title slides, disclaimer slides, template slides, etc. If a text search is performed using a term that is common to these slides, the number of hits would be extremely high. It would be a waste of time if a user had to look through all these same slides. Therefore, de-duplication module 44 can reduce that number down to a single slide and parse out the extra duplicates slides, making the display more user friendly.

Slide processing module 36 therefore performs several functions to organize database 39 such that individual slides can be searched. Much of this functionality can be considered to be performed in the background without the user's knowledge. Slide processing module 36 can be used in a set-up stage when presentation content managing system 10 is initially established. In the set-up stage, slide processing module 36 can receive multiple presentation files uploaded into database 39 and process the files as mentioned above. Also, slide processing module 36 can be used in an ongoing manner when new presentations are uploaded into database 39 to perform the disassembly, fingerprinting, and de-duplication tasks to add the new slides to database 39.

As time goes on and slide processing module 36 processes more and more presentations and slides, the amount of content in database 39 can grow to include a vast library of presentation material available to the users. When numerous members of the organization or enterprise share their presentations, the creation of new presentations can be done more efficiently and can often provide a wider breadth of material from many different sources. User responsive module 38, as defined in more detail below, uses presentation content stored in database 39 to provide interactive functionality based on a user's actions.

As a part of user responsive module 38, search engine 46 is configured to manage the search functionality of presentation content managing module 20. Search engine 46 receives the search term or terms that the user enters from end-user device 16. When multiple search terms are entered, search engine 46 can accept exact phrases, AND operators, OR operators, or any combination of these. Search engine 46 matches the search terms with the text files that are extracted from the slides. The search terms can be matched with text appearing anywhere in the slide, such as, for example, the title, body, notes, footnotes, etc. In some embodiments, search engine 46 can perform a search within a particular social network, such as an ESN, with which the searching user is associated. Therefore, only the search results for the slides relevant to the particular searcher are revealed. Also, in some cases, search engine 46 can ignore certain stop words, such as "a," "the," etc.

In some embodiments, search engine 46 can arrange the search results in an order based on the number of times the search term appears in a particular slide. Another criteria for ordering search results may include the age of the slide, where the most recent slides are ordered first. Search engine 46 can then send information associated with the slides, e.g., text information files and graphic files, to end-user device 16 for displaying the search results using a GUI, as explained in more detail below.

Tag processing module 48 is configured to store tags, or key words, which are used to define a slide. For example, if a slide does not include specific searchable text within the slide itself, a tag can be applied for the purpose of identification. When a presentation if first uploaded, tag processing module 48 allows the person who uploaded the presentation to enter key words that can help to group specific content within the same category. Thus, tags can help to form these associations or categories among the slides and can help to filter the content based on how others may have used particular key words. Particularly, other users who access the slides at a later time can also add tags if desired. Tag processing module 48 sends tag information to the GUI associated with end-user device 16 to display the tags that have already been entered for the respective slides. Also, tag processing module 48 enables a user to enter a new tag if desired.

If a key word is being used multiple times to associate a certain slide with the particular key word, tag processing module 48 can render that key word on the GUI with a larger font size or by some other highlighting technique to indicate that the popularity of that key word is higher than other key words. The monitoring of the frequency of this association is referred to herein as a "tag cloud." This allows a user to quickly and easily find certain slides during a search process. In some embodiments, the tag words can be searched in the search process.

Comment processing module 50 is similar in some ways to tag processing module 48. Comment processing module 50 enables the display of comments or reviews that other users have made with respect to a particular slide. These comments can be displayed on the GUI during the search process. Also, comment processing module 50 enables the user to add a new review if desired. These comments can be used to help the searcher determine the relevance of the particular slides that are revealed during the search.

Rating processing module 52, like tag processing module 46 and comment processing module 50, helps to provide additional information about the particular slides. However, rating processing module 52 is configured to show a rating scale of how effective or useful a particular slide is perceived by a number of users. For example, the rating scale may include a number of "stars," ranging from one star to five stars, for rating the slide. Users can enter a rating based on the user's experience with the slide or by some other observations. Rating processing module 52 is configured to average these ratings and then send the rating, e.g., number of stars, to the GUI associated with end-user device 16 for display of the average rating.

Tag processing module 48, comment processing module 50, and rating processing module 52 enable the user to view and/or add tags, comments, and ratings for each slide. The tags, comments, and ratings are referred to herein as "social metadata." This social metadata is stored in association with each respective slide. Also, the social metadata is kept contextual with respect to the particular ESN or ESNs in which the social metadata was entered. In this way, a slide might be more useful with respect to one community while not so useful in another community.

Slide folder 54 includes temporary storage for storing one or more slides for the current user during the search process. When a user views a slide that the user wishes to save, the user can select the slide by some selection mechanism or function. Slide folder 54 then saves a copy of the selected slide in its storage.

Download processing module 56 enables the user to download the slides that have been saved in slide folder 54 if desired. Also, the user may wish to download an entire presentation. In this case, download processing module 56 downloads the presentation to end-user device 16. The user can then save the selected slides and/or slides from the entire presentation on local storage, which allow the user to further process the slides if needed.

Upload processing module 58 allows a new presentation created by a user to be uploaded into database 39. Upload processing module 58 also enables the user to pick which ones of a number of ESNs where the presentation is shared. Thus, using upload processing module 58, users can publish the slide presentation content on one or more communities or ESNs. Once published, other members of a respective community can search that content, add comments, tags, or ratings for that content, and leverage the content to assemble their own presentations.

The upload process differs from other uploading systems that typically allow a user to upload a file from a desktop to a server so that others can immediately download the file from the server. In presentation content managing module 20, upload processing module 58 uploads the slide presentation files into database 39, but does not make the files immediately available. Instead, slide processing module 36, as described above, is configured to perform the disassembly, fingerprinting, and de-duplication processes before the slides are prepared for storage, search, and retrieval. After the processing by slide processing module 36 is complete, however, the slide can then be accessed from server 14.

Figure 4:
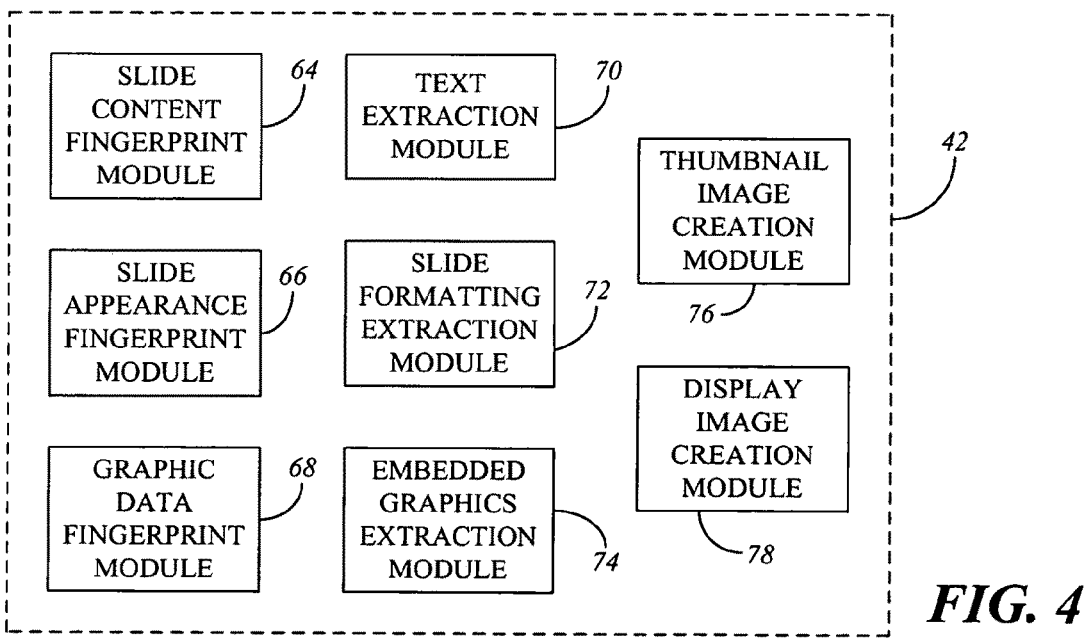
FIG. 4 is a block diagram illustrating the slide fingerprinting module shown in FIG. 3, according to one embodiment.

FIG. 4 is a block diagram illustrating an embodiment of slide fingerprinting module 42 shown in FIG. 3, according to one implementation. In this embodiment, slide fingerprinting module 42 includes a slide content fingerprint module 64, a slide appearance fingerprint module 66, a graphic data fingerprint module 68, a text extraction module 70, a slide formatting extraction module 72, an embedded graphics extraction module 74, a thumbnail image creation module 76, and a display image creation module 78. The term "fingerprint" is used herein to refer to a signature, characteristic, property, or unique identifying feature of a presentation slide.

Slide content fingerprint module 64 contains a unique code generated from the text and image content found on each slide. Slide content fingerprint module 64 stores one slide content fingerprint for each slide found in the presentation document. This fingerprint can be used to find slides that share the same content, regardless of formatting. In one embodiment, the text, embedded graphics, and objects found on each slide must be identical and must be drawn in the same logical order in order for the content fingerprint of two slides to match. All other slide attributes, including shape types, locations, and fills, are ignored when generating this fingerprint.

The slide content fingerprint stored in slide content fingerprint module 64 allows the searching end-user device to detect slides that very likely originated from the same source slide even when they have undergone changes to their appearance. For example, if a presentation is modified to use a different slide master, background, or other formatting attributes, the slide content fingerprints will remain the same as in earlier versions.

Slide appearance fingerprint module 66 contains a slide appearance fingerprint for each slide. The slide appearance fingerprint is an extension of the slide content fingerprint, but additionally considers the shape type, location, fill type, and primary fill color of every shape found on the slide. The slide background and applicable master are also considered when generating this fingerprint. The text, embeddings, selected shape attributes, slide background, and the applicable master appearance signatures must be identical, and drawn in the same logical order, in order for the slide appearance fingerprint of two slides to match. There are many other slide attributes that are ignored when generating this fingerprint, including comments, speaker notes, advanced fill attributes, and transitions, to name a few. However, most reasonable changes to a slide's appearance will result in a modified fingerprint. The slide appearance fingerprint allows the searching end-user device to detect slides that are extremely similar in both content and formatting. For example, when presentations or specific slides are copied and shared among a group of contributors, individual slides will maintain the same fingerprint until they undergo some level of content or formatting edits.

Graphic data fingerprint module 68 contain a graphic data fingerprint that is extracted for each slide. The graphic data fingerprint is a unique code generated from the image data associated with embedded graphic content extracted from embedded graphics extractions module 74. This content can be found, for example, within Microsoft Office documents including PowerPoint®. Other graphic content can be extracted from other presentation software applications. There is one graphic data fingerprint for each graphic image found in the presentation document. This fingerprint is also incorporated into the slide content and slide appearance fingerprints each time the associated graphic is found on a slide. This fingerprint allows the searching application to find all slides or documents that include a specific graphic image given its fingerprint.

Fingerprint consistency can be maintained across different versions of Microsoft Office. It is not uncommon for a presentation to be modified and saved between different versions of Microsoft PowerPoint® during the presentation's lifecycle. When a presentation is edited using different versions of PowerPoint®, the presentation is likely to undergo slight changes that are not visually obvious. The fingerprint algorithms discussed herein can be designed with consideration for these changes. As a result, the slide content, slide appearance, and graphic data fingerprints of otherwise unmodified slides are typically maintained across saves between different versions of PowerPoint® from Office 97 through Office 2003.

The introduction of Office 2007 has resulted in substantial feature and storage changes in PowerPoint® documents. When a PowerPoint® document (Office 97 through 2003) is opened in Office 2007 in compatibility mode, and then saved back to the native PowerPoint® format, it will have undergone a conversion process that is more substantial than in earlier versions of PowerPoint®. The graphic data fingerprint will still be maintained through such a conversion. However, the slide content fingerprint may sometimes change and the slide appearance fingerprint will almost certainly change even though the slide has not been edited. This is due to how Microsoft Office 2007 converts between earlier versions of PowerPoint®. Specifically, there are commonly slight changes to how master reference text and numerous shape attributes are stored that adversely affect the fingerprint.

Text extraction module 70, slide formatting extraction module 72, and embedded graphics extraction module 74 support the generation of the fingerprints described above through a set of Boolean options that can be enabled. These options are turned off by default. For example, GenerateSlideContentFingerprint, GenerateSlideAppearanceFingerprint, and GenerateGraphicDataFingerprint options can be selectively turned on to cause each type of fingerprint to be generated. When a fingerprint option is enabled, the extraction process will include fingerprint elements in the extracted output that include an attribute named "type" and an attribute named "value." The "type" attribute will indicate which of the three fingerprint types is being provided. Thumbnail image creation module 72 takes the slide disassembled by disassembly module 40 and creates thumbnail images that can be rendered on the GUI in a window of GUI associated with slide folder 54.

Figure 5:
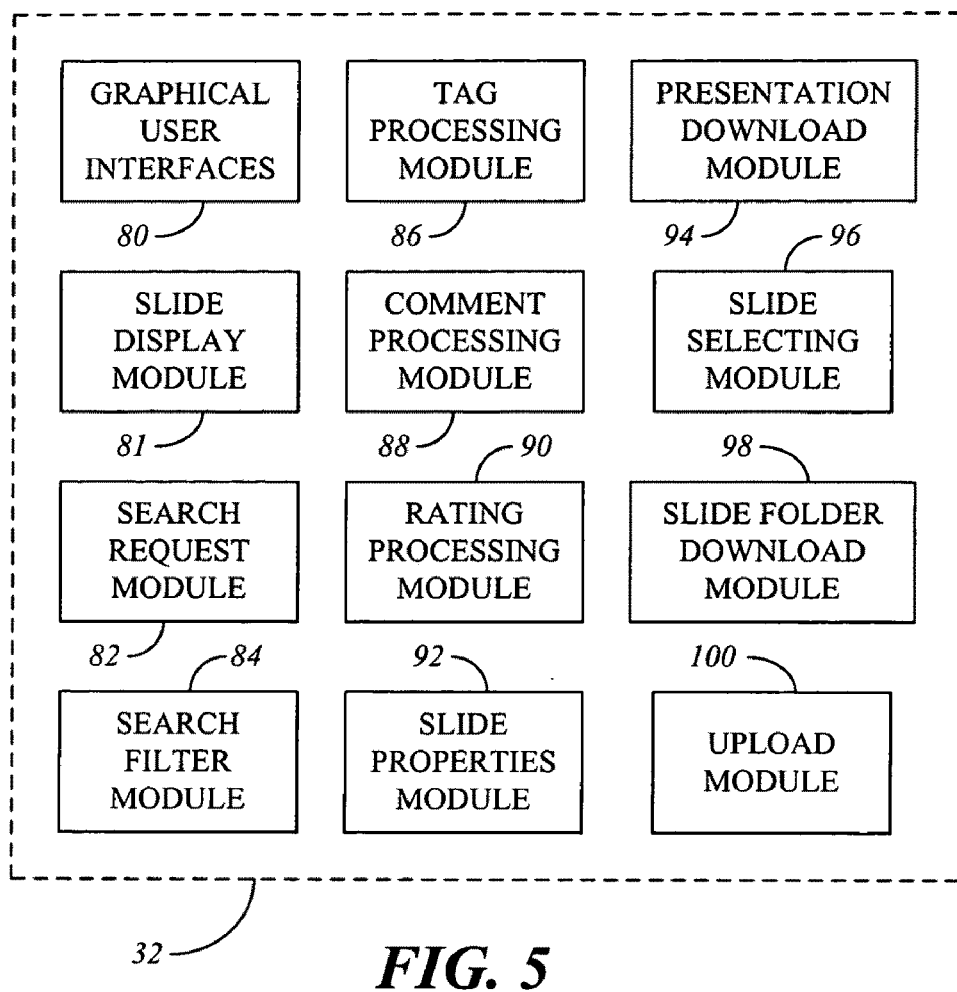
FIG. 5 is a block diagram illustrating the presentation module executed by the end-user device shown in FIG. 2, according to one embodiment.

FIG. 5 is a block diagram illustrating an embodiment of presentation module 32 shown in FIG. 2, according to one implementation. In this embodiment, presentation module 32 includes a number of graphical user interfaces (GUIs) 80, a slide display module 81, a search request module 82, a search filter module 84, a tag processing module 86, a comment processing module 88, a rating processing module 90, a slide properties module 92, a presentation download module 94, a slide selecting module 96, a slide folder download module 98, and an upload module 100.

GUIs 80 are associated with presentation module 32 for displaying slide presentation information to the user and for enabling a user to enter information for conducting a text search, viewing and entering social metadata, selecting slides, downloading selected slides, and uploading a new slide presentation. GUIs 80 are shown in particular with respect to FIGS. 7-12, as describe more fully below.

Slide display module 81 is configured to operate with GUIs 80 to display the slides in a particular fashion on GUIs 80. Slide display module 81 may include a carousel type arrangement of slides and other features. Details of slide display module 81 are described below with respect to FIG. 6.

Search request module 82 enables a user to enter a request to conduct a text search. The text search can be performed to find slides that share the particular search term or terms. Also, the search can find slides that have associated social metadata tags that match the search terms. Furthermore, search filter module 84 enables a user to narrow down the search results, such as when the number of hits is too large for the user's interest. Search filter module 84 can filter out slides that do not meet certain filter criteria. For example, the results can be filtered with respect to a minimum rating of the slides, an oldest age of the slides, and/or other filter criteria.

Tag processing module 86, comment processing module 88, and rating processing module 90 operate in conjunction with tag processing module 48, comment processing module 50, and rating processing module 52, respectively, which are described above with respect to FIG. 3. These modules 86, 88, and 90 represent the user interface components for viewing and/or adding social metadata.

Tag processing module 86 may be configured to display four tags at a time. If more tags are associated with the particular slide, a "more" button can be displayed to enable the user to view the additional tags. In some embodiments, tag processing module 86 can display the tags in alphabetical order. In other embodiments, the tags can be displayed by popularity or frequency of actual access by the particular tags. When a user wishes to add a tag, tag processing module 86 opens a text entry box to enable entry of a tag. After entry, tag processing module 86 may temporarily display a window with a message such as "Thank you for tagging!"

Comment processing module 88 may be configured to display comments within a limited amount of space. If the comments exceed this space, a "more" button can be displayed to enable the user to view the additional comments. When a user wishes to add a comment, such as by pressing a "post comment" button, comment processing module 88 opens a text entry box to enable entry of a comment. The text entry box may also include an indicator letting the user know how many additional characters can be entered without exceeding a limit. For example, the message may read "You have ## characters remaining." In some cases, the limit may be 1000 characters. After entry of the comment, comment processing module 88 may display a message, such as "Thank you for your comment!" In some embodiments, comment processing module 88 may display the date and time that each respective comment was submitted and/or the name of the user submitting the comment.

Rating processing module 90 is configured to display an average rating that others have entered for the particular slide. Rating processing module 90 may include a slider for entering a rating, or display a number of stars that the user can click to enter a rating. The rating can be displayed in stars, for example, such that one star represents "poor," two stars represents "nothing special," three stars represents "worth a look," four stars represents "good," and five stars represents "awesome." After the user enters a rating, rating processing module 90 can display a message, such as "Thank you for rating!"

Slide properties module 92 is configured to display on the GUI certain properties of a highlighted slide. For example, slide properties module 92 may display information that describes the number of presentation in which a particular slide appears. Also, the names of these presentation can be displayed.

Presentation download module 94 is configured to transmit a user's request to server 14, requesting that server 14 download an entire presentation to end-user device 16. Presentation download module 94 may include download requesting buttons or icons on GUIs 80 to enable the user to download a selected presentation.

Slide selecting module 96 may include any suitable selection component, such as a selection button, selection icon, etc., for enabling the user to select a particular slide. In the carousel arrangement, the slide that can be selected is the slide that is most prominently displayed. When a slide is selected, slide selection module 96 communicates to server 14 to place a copy of the selected slide in slide folder 54 (FIG. 3). Slide selection module 96 can also display a separate window in GUI 80 to show those slides that the user has selected during the current search and retrieval session. The window can show the number of slides selected and may include a thumbnail image for each of the slides.

Presentation module 32 of FIG. 5 further includes a slide folder download module 98. When the user has selected one or more slides during the search process and can review the slides in the slide folder window displayed on GUI 80, slide folder download module 98 can be initiated by the user to download those selected slides onto local memory, such as within memory device 24 (FIG. 2).

With the downloaded slides downloaded by slide folder download module 98 and even the slides of entire presentations downloaded by presentation download module 94, the user can run regular presentation software to create new slide presentations. When a new presentation is created, the user can press an upload button or other suitable upload selection mechanism associated with upload module 100, which is configured to upload the new presentation to database 39 (FIG. 3). The upload process can be compared to a publish process used in social networks to post or submit new material to a server. Upload module 100 opens a window that allows the user to select one or more ESNs that can receive the uploaded document. In some embodiments, the available ESNs shown to the user can be those of which the user is actually a member.

Figure 6:
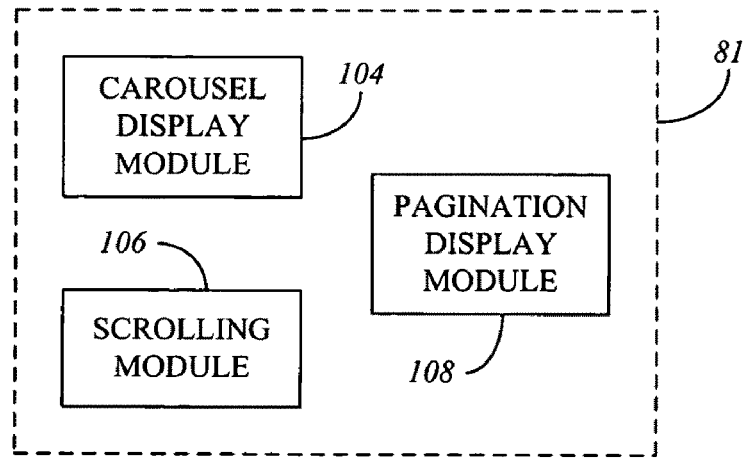
FIG. 6 is a block diagram illustrating the slide display module shown in FIG. 5, according to one embodiment.

FIG. 6 is a block diagram illustrating an embodiment of slide display module 81 shown in FIG. 5, according to one implementation. In this embodiment, slide display module 81 includes a carousel display module 104, a scrolling module 106, and a pagination display module 108. Carousel display module 104 is configured to display a number of slides in a carousel arrangement, which includes a prominently displayed slide in the middle of the display. Also, a number of other slides can be shown on one or both sides of the prominently displayed slide. Specifically, the prominently displayed slide is shown superimposed over the other slides and is larger than the other slides. The other slides can be shown in a manner such that those slides farthest from the prominently displayed slide are smaller than those closer to the prominently displayed slide. In particular, the slides displayed by carousel display module 104 can include the slides that were revealed during the search process.

Scrolling module 106 is configured to enable the user to navigate through the list of slides. When the user scrolls to the right, such as by pressing a right arrow button, scrolling module 106 rotates the carousel of slides to the right to display another slide as the prominently displayed slide. Likewise, to scroll to the left, a left arrow button can be pressed to rotate the slides to the left. Scrolling module 106 may include animation features for showing the act of moving the slides in a particular direction.

Pagination display module 108 is configured to determine the number of slides to be displayed in the carousel arrangement. Also, pagination display module 108 determines the sequence number of the slide within the total number of slides. Pagination display module 108 displays the page number of the slide that is shown as the prominently displayed slide. For example, if there are 20 slides and the fifth slide is the prominently displayed slide, pagination display module 108 can display "5 of 20" in an unobtrusive location on GUI 80.

Figure 7:
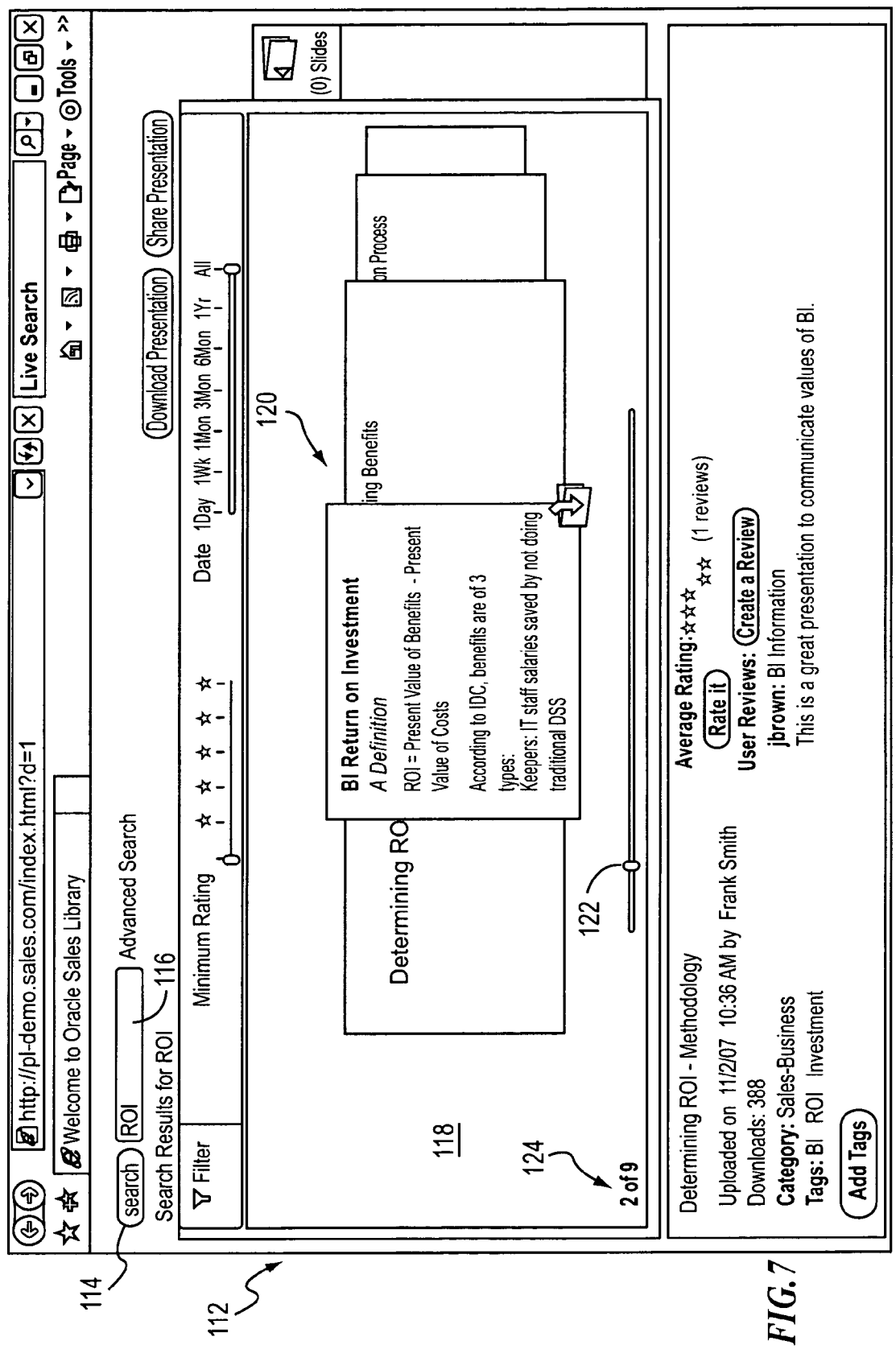
FIG. 7 is a diagram illustrating a first example of a graphical user interface ("GUI") for enabling a user to manage shared presentation content, according to one embodiment.

FIG. 7 is a diagram illustrating an embodiment of a GUI 112 for enabling a user to conduct a text search of shared presentation content, according to one implementation. In this embodiment, GUI 112 includes search button 114 and text window 116. The user can enter one or more search terms and appropriate Boolean terms, such as "and," "or," or other similar term within text window 116. When search button 114 is pressed, search request module 82 (FIG. 5) sends the search request to search engine 46 (FIG. 3), which conducts the search. The results are returned back to end-user device 16 and can be displayed in slide display area 118, which may be associated with slide display module 80 (FIG. 5). Slide display area 118 shows the individual slides retrieved during the search and are displayed in a carousel arrangement 120 by carousel display module 104 (FIG. 6). Slide display area 118 also includes a scrolling tab 122 that allows a user to navigate through the plurality of slides. Also displayed in slide display area 118 is a pagination indicator 124 to show which slide or page is shown prominently with respect to the total number of slides.

Figure 8:
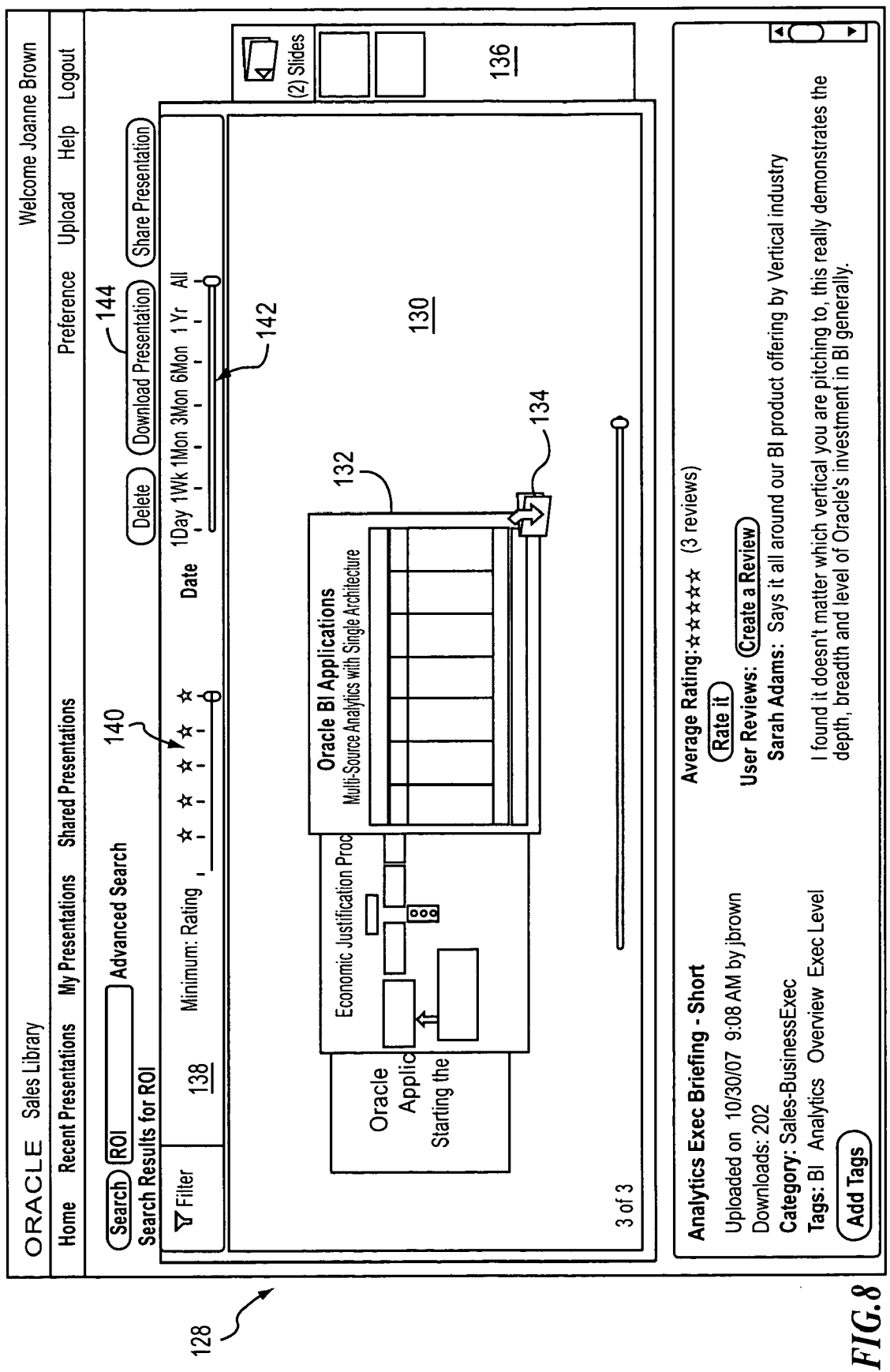
FIG. 8 is a diagram illustrating a second example of a GUI for enabling a user to manage presentation content, according to another embodiment.

FIG. 8 is a diagram illustrating an embodiment of a GUI 128 for enabling a user to filter the search results of a text search, according to one implementation. In this embodiment, GUI 128 includes slide display area 130 with prominently displayed slide 132 and other slides in the background. Slide display area 130 also includes a slide copying icon 134 that allows a user to save a copy of prominently displayed slide 132 if desired. The copied slide is shown as a thumbnail image in slide folder window 136 to the right of slide display area 130. Slide folder window 136 is associated with the files that are saved in slide folder 54 (FIG. 3).

In order to filter the search results, GUI 128 includes search result filtering device 138, which includes a minimum rating filter 140 and an oldest age filter 142. In other embodiments, search result filtering device 138 may include these and/or other filters for enabling the user to narrow down the number of slides in the search results. Also shown in GUI 128 is a download button 144, which allows a user to download an entire presentation from which the prominently displayed slide was taken.

Figure 9:
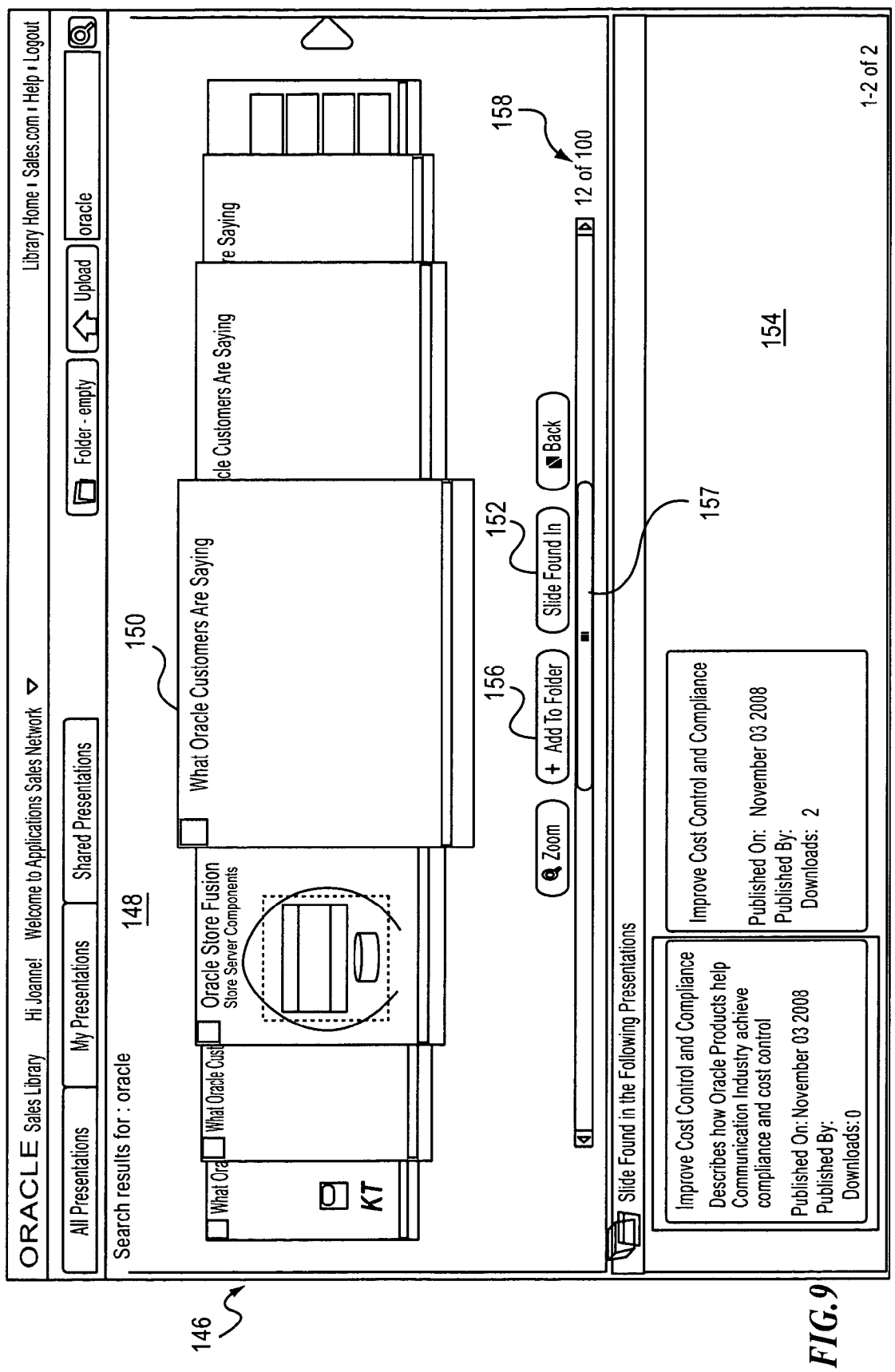
FIG. 9 is a diagram illustrating a third example of a GUI for enabling a user to manage presentation content, according to another embodiment.

FIG. 9 is a diagram illustrating an embodiment of a GUI 146 for enabling a user to view slide properties, according to one implementation. In this embodiment, GUI 146 includes slide display area 148 showing prominently displayed slide 150 and other slides in the background. GUI 146 also includes a presentation identifying button 152, e.g., in this case, a "slide found in . . ." button. In this embodiment, presentation identifying button 152 utilizes slide properties module 92 to determine the presentation or presentations from which prominently displayed slide 150 was taken. A presentation identifying window 154 displays information about these presentations where prominently displayed slide 50 can be found. In other embodiments, GUI 146 may include other buttons in addition to presentation identifying button 152 for retrieving other information with respect to a particular slide or presentation.

GUI 146 also includes a slide copying button 156, which can be an alternative to slide copying icon 134 shown in FIG. 8. GUI 146 of this embodiment also includes an alternative scrolling mechanism 157 as compared with scrolling tab 122 shown in FIG. 7. GUI 146 also includes an alternative pagination indicator 158 shown in the lower right hand corner of slide display area 148.

Figure 10:
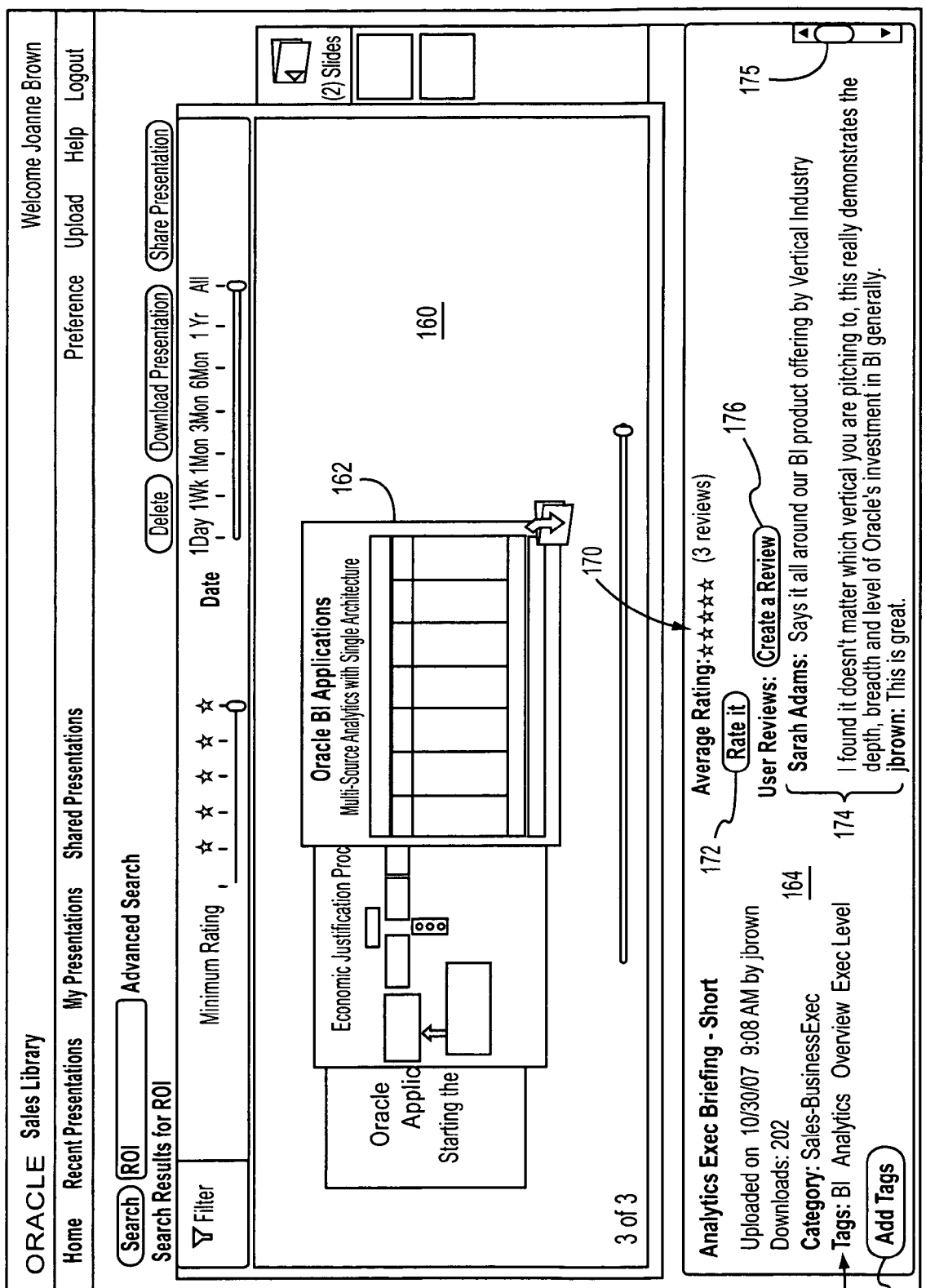
FIG. 10 is a diagram illustrating a fourth example of a GUI for enabling a user to manage presentation content, according to another embodiment.

FIG. 10 is a diagram illustrating an embodiment of a GUI 159 for enabling a user to view and/or add social metadata for a slide, according to one implementation. In this embodiment, GUI 159 includes a slide display area 160 showing a prominently displayed slide 162 and other slides in the background. GUI 159 also includes a social metadata window 164 covering a bottom region of GUI 159. The term "social metadata," as used in the present disclosure, refers to tags, comments, reviews, ratings, etc. that apply to a particular slide. Members of a specific social network in which the slide is related can enter this social metadata, which can then be displayed for the other members who access that slide at a later time. Not only can a member view the social metadata, but also the member can add further social metadata if the member desires. In this way, when several samples of social metadata are entered for a particular slide, someone creating a new presentation can have a wealth of information about the slide from a diverse group. This social metadata can help the user decide whether or not to use the slide in the new presentation.

In social metadata window 164, a tag display area 166 shows list of tags or key words that have been applied to the slide. The tags may include actual text that has been used in the slide itself. Alternatively, the tags can include other key words that may not be known to the audience to whom the presentation is displayed but only to the members of the social network. The tags may be entered by the creator of the presentation and/or by members of the social network. To add a new tag, the user can click on an "add tags" button 168 within social metadata window 164. Tag display area 166 and add tags button 168 may be associated with tag processing module 86 shown in FIG. 5.

Social metadata window 164 also includes a rating display area 170, which shows an average rating for the slide. The rating can be shown using a scale such as a number of stars (as shown) or using any other suitable scale system. Also in rating display area 170 is an indication of the number of people who have entered a rating, i.e., "3 reviews" in this case. Below rating display area 170 is a rating adding button 172, which allows a user to enter a rating. Rating display area 170 and rating adding button 172 may be associated with rating processing module 90 shown in FIG. 5. In some embodiments, rating processing module 52 (FIG. 3) may record the members who have already provided a rating. Therefore, if a member tries to enter a rating again, rating processing module 52 can provide a message to the user that a rating has already been received from that member.

Social metadata window 164 also includes a review display area 174, which displays the reviews or comments that other users have entered for prominently displayed slide 162. Review display area 174 can show the comments in an order beginning with the most recent review. Review display area 174 may have a limited amount of space within social metadata window 164, but in some embodiments a user may be able to see further comments using a scrolling mechanism 175, which may be displayed if necessary. If a user wishes to add a comment about the slide, the user can click on a comment adding button 176. Review display area 174 and comment adding button 176 may be associated with comment processing module 88 shown in FIG. 5.

Figure 11:
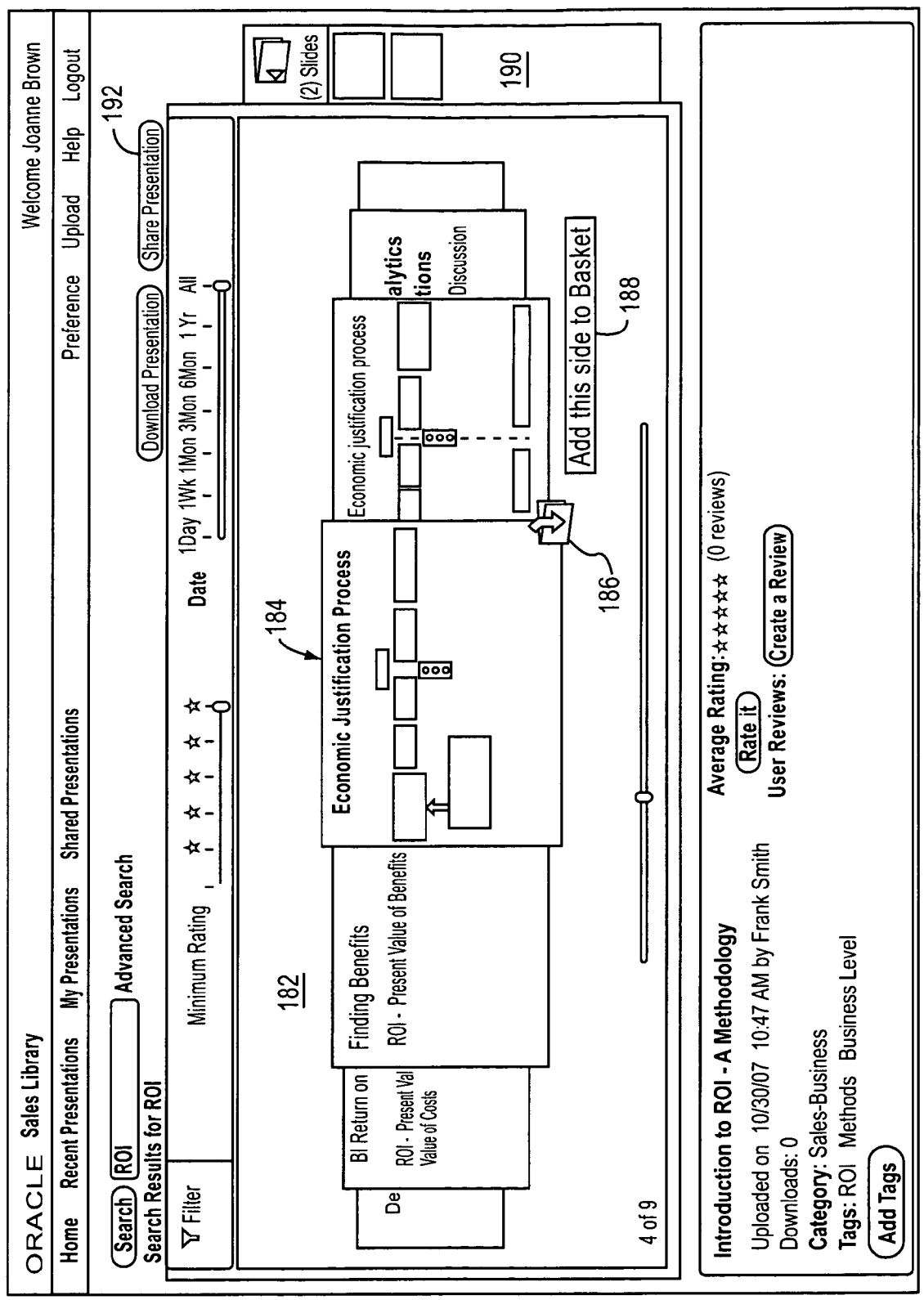
FIG. 11 is a diagram illustrating a fifth example of a GUI for enabling a user to manage presentation content, according to another embodiment.

FIG. 11 is a diagram illustrating an embodiment of a GUI 180 for enabling a user to add a selected slide to a slide folder, according to one implementation. In this embodiment, GUI 180 includes a slide display area 182 showing a prominently displayed slide 184 and other slides in the background. For copying prominently displayed slide 184 for the user's own presentation, the user can click on a slide copying icon 186 or a slide copying button 188. Information of the selected slide can be sent from slide selecting module 96 (FIG. 5) to instruct user responsive module 38 to save a copy of this slide in slide folder 54. GUI 180 includes a slide folder window 190, which shows the number slides that have been copied and a thumbnail image of the copied slides.

GUI 180 also includes an upload button 192. When the user has had the opportunity to search through a number of slides and presentations, select certain slides, download the selected slides, and make further edits to the slides as needed, the user can then finalize a new presentation. When the user is satisfied with the new presentation, the user can upload the new presentation to server 14, as described in more detail below with respect to FIG. 12.

Figure 12:
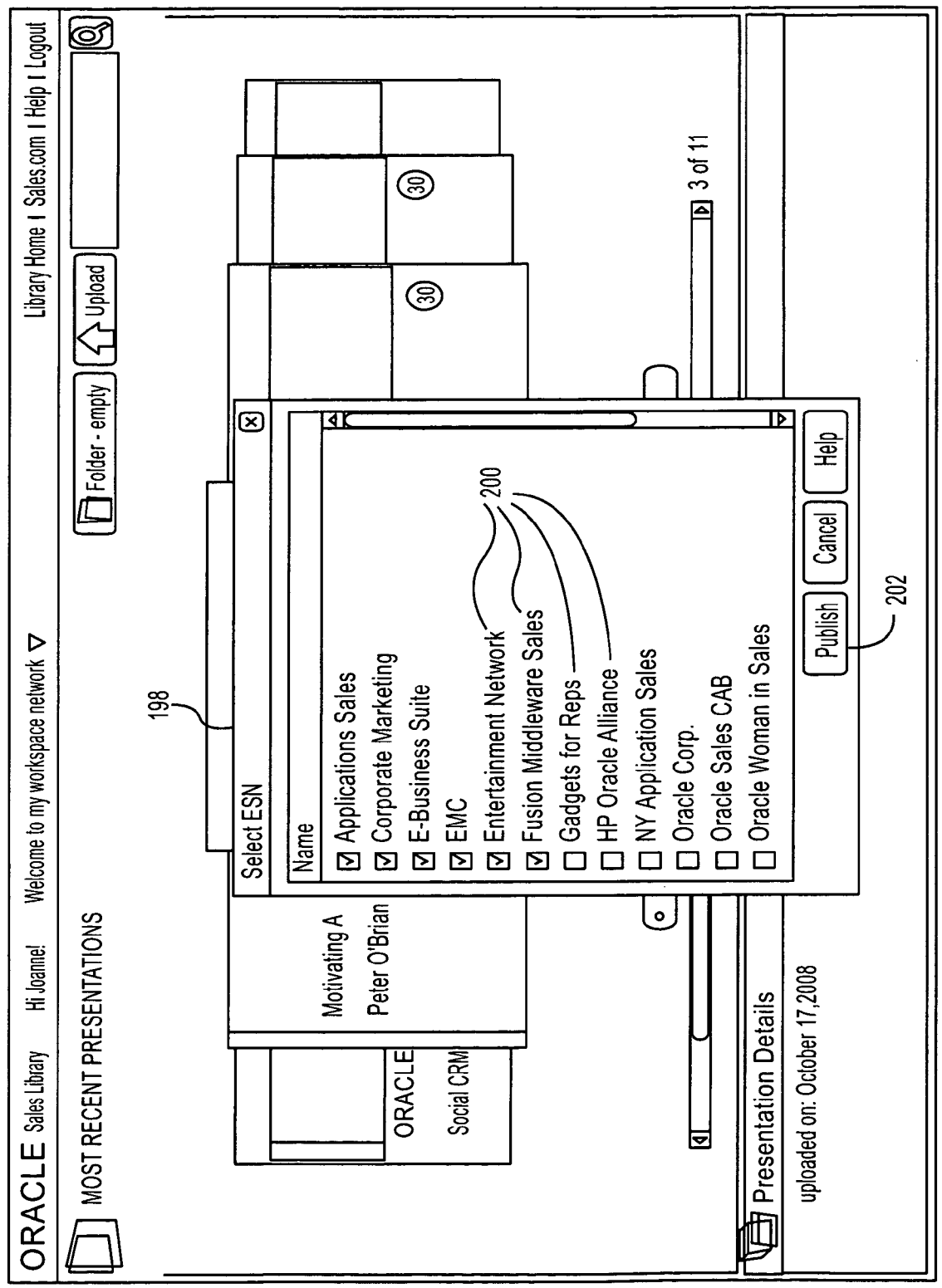
FIG. 12 is a diagram illustrating a sixth example of a GUI for enabling a user to manage presentation content, according to another embodiment.

FIG. 12 is a diagram illustrating an embodiment of a GUI 196 for enabling a user to publish a new slide presentation in one or more enterprise social networks, according to one implementation. In this embodiment, GUI 196 allows the user to request to upload a new presentation, as described with respect to FIG. 11. In response, an upload window 198 is displayed, superimposed over GUI 196. Upload window 198 includes a list of ESNs 200, which can be selected by the user.

For example, if the user is a member of several social networks that can benefit from having access to the new presentation, then the user can select the appropriate ESNs. When a publish button 202 is pressed, upload module 100 (FIG. 5) uploads the new presentation to server 14 for access by any one of the selected ESNs. In some embodiments, GUIs shown in FIGS. 7-12 may be associated with GUIs 80 shown in FIG. 5.

Figure 13:
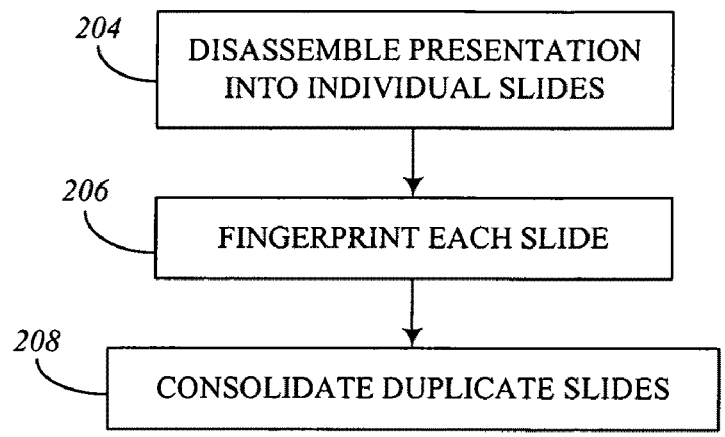
FIG. 13 is a flow diagram illustrating a method of a server of a presentation content managing system, according to one embodiment.

FIG. 13 is a flow diagram illustrating an embodiment of a method of a server within a slide presentation management system for managing slide presentation content. In this embodiment, a presentation is disassembled into a number of individual slides, as indicated in block 204. For example, the disassembly process can create one file for each slide of the disassembled presentation. As indicated in block 206, a fingerprinting process is performed for each slide. For example, image files and text files can be created for each slide. The image files may include at least one thumbnail image and at least one full-scale image having greater resolution than the thumbnail image. The text files may include all the text that is displayed in the respective slides. In addition, other files may be created in this process. For example, information related to formatting information of each slide as well as information that is common throughout a respective presentation may be created from each slide.

As indicated in block 208, duplicate slides are consolidated. Slides can be determined to be duplicates based on any combination of comparison criteria. For example, slides can be considered to be duplicates if the text files of the slides are exactly the same, and, in other cases, slides may be considered duplicates if they are substantially similar, based on the particular comparison algorithms being used. In some embodiments, comparison can be made based on formatting and image information. The consolidated slides are displayed as a single slide on a GUI which displays the results of a search conducted by a user.

The following pseudo-code implements PowerPoint slide fingerprinting per block 206 of FIG. 13 in accordance with one embodiment:

```
/*
// Declaration of variables
.
.
.
    private boolean outputSlideContentFingerprint = false;
    private boolean outputSlideAppearanceFingerprint = false;
    MessageDigest contentFingerprint;
    MessageDigest appearanceFingerprint;
.
.
.
// Initialization of processes
.
.
.
        outputSlideContentFingerprint =
scrubContext.request.getOption(SecureOptions.GenerateSlideContentFingerprint);
        outputSlideAppearanceFingerprint =
scrubContext.request.getOption(SecureOptions.GenerateSlideAppearanceFingerprint);
.
.
.
        if( outputSlideContentFingerprint || outputSlideAppearanceFingerprint ) {
            try {
                contentFingerprint = MessageDigest.getInstance("MD5");
                if( outputSlideAppearanceFingerprint )
                    appearanceFingerprint = MessageDigest.getInstance("MD5");
            } catch (NoSuchAlgorithmException e) {
                throw new TransformException("Failed to instantiate MD5 hash for slide fingerprinting.");
            }
            escherProcess.enableImageFingerprinting( );
        }
.
.
.
        boolean contentFingerprinting = false;
        boolean appearanceFingerprinting = false;
        if( outputSlideContentFingerprint || outputSlideAppearanceFingerprint )
            contentFingerprinting = true;
        if(outputSlideAppearanceFingerprint)
            appearanceFingerprinting = true;
.
.
.
// executed on every shape found on a slide
        if ( appearanceFingerprinting ) {
            fingerprintShape ( appearanceFingerprint, cts );
        }
.
.
.
// executed on every image referenced within a slide
        if ( cts.foundGraphicRef ) {
```

-continued

```
                extractContext.startContentRef(ContentRefElementType.GRAPHIC, cts.graphicRef );
                extractContext.endContentRef( );
                if ( contentFingerprinting ) {
                    byte [ ] imageFingerprint = escherProcess.getFingerprint((int)cts.graphicRef);
                    if ( imageFingerprint != null )
                        contentFingerprint.update(imageFingerprint);
                }
            }
.
.
.
// executed on every text character found on a slide
                    default:
                        if ( contentFingerprinting ) {
                            contentFingerprint.update((byte)(c >> 8));
                            contentFingerprint.update((byte)(c & 0xFF));
                        }
                        extractContext.add(c);
                        break;
.
.
.
// executed on each slide found in a presentation
        if ( contentFingerprinting ) {
            pc.contentFingerprint = contentFingerprint.digest( );
            if ( normalSlide && outputSlideContentFingerprint ) {
extractContext.startFingerprint(FingerprintElementType.SLIDECONTENT,pc.contentFingerprint);
                extractContext.endFingerprint( );
            }
            if ( appearanceFingerprinting ) {
                appearanceFingerprint.update(pc.contentFingerprint);
                // If this has an associated master (not itself a primary master) then add the slides master
                // appearance fingerprint to this slides appearance fingerprint
                if ( pc != slideMaster )
                    appearanceFingerprint.update(slideMaster.appearanceFingerprint);
                pc.appearanceFingerprint = appearanceFingerprint.digest( );
                if ( normalSlide && outputSlideAppearanceFingerprint ) {
extractContext.startFingerprint(FingerprintElementType.SLIDEAPPEARANCE,pc.appearanceFingerprint);
                    extractContext.endFingerprint( );
                }
            }
        }
// methods that supports fingerprinting each shape on a slide
        private void fingerprintShape ( MessageDigest md, ShapeContext sc ){
            if ( sc.shape != null ) {
                fingerprint ( md, sc.shape.at_inst );
                fingerprint ( md, sc.top );
                fingerprint ( md, sc.left );
                fingerprint ( md, sc.bottom );
                fingerprint ( md, sc.right );
                if ( sc.background == null || sc.background.fillType == null )
                    fingerprint ( md, 1); // default solid fill
                else
                    fingerprint ( md, sc.background.fillType.at_op );
                if ( sc.background == null || sc.background.fillColor == null )
                    fingerprint ( md, 0xFFFFFF ); // default white
                else
                    fingerprint ( md, sc.background.fillColor.at_op );
            }
        }
        private void fingerprint ( MessageDigest md, long x ) {
            md.update((byte)(x >> 24));
            md.update((byte)(x >> 16));
            md.update((byte)(x >> 8));
            md.update((byte)(x & 0xFF));
        }
/*
        Code that supports fingerprinting graphic image data foundin Office file formats
*/
// Declaration and initialization of variables
private boolean outputGraphicDataFingerprint;
        outputGraphicDataFingerprint =
scrubContext.request.getOption(SecureOptions.GenerateGraphicDataFingerprint);
        if ( outputGraphicDataFingerprint )
            enableImageFingerprinting( );
.
.
.
```

```
    private boolean imageFingerprinting = false;
    MessageDigest imageFingerprint;
    ArrayList fingerprintList = null;
.
.
.
// image data fingerprinting support methods
    void enableImageFingerprinting ( ) throws IOException {
        if ( imageFingerprinting == false ) {
            try {
                imageFingerprint = MessageDigest.getInstance("MD5");
                fingerprintList = new ArrayList( );
            } catch (NoSuchAlgorithmException e) {
                throw new TransformException("Failed to instantiate MD5 hash for image fingerprinting.");
            }
            imageFingerprinting = true;
        }
    }
    byte[ ] getFingerprint ( int blipReference ) {
        if ( blipReference <= fingerprintList.size( ) )
            return ( (byte [ ])fingerprintList.get(blipReference−1) );
        else
            return null;
    }
.
.
.
// fingerprinting of image data implementation
        byte fingerprintResult[ ] = null;
        if ( imageFingerprinting ) {
            byte[ ] buf = new byte[2048];
            long savePosition = sourceData.getPosition( );
            sourceData.setPosition(0);
            int byteCount = sourceData.getBytes (buf);
            while ( byteCount > 0 ) {
                imageFingerprint.update(buf, 0, byteCount );
                byteCount = sourceData.getBytes (buf);
            }
            fingerprintResult = imageFingerprint.digest( );
            sourceData.setPosition(savePosition);
            // store the fingerprint to allow retrieval when the image is referenced
            while ( (int)blipCount − 1 > fingerprintList.size( ) )
                fingerprintList.add(null);
            fingerprintList.add( fingerprintResult );
        }
        EmbeddedContentAction eaAction;
        eaAction = extractContext.startEmbeddedContent(EmbeddedContentElementType.GRAPHIC,
description,sourceFormat,blipCount,
            isReplaceable, replaceMax, replacementFormats, extraHeader, sourceData);
        if ( outputGraphicDataFingerprint && fingerprintResult != null ) {
            extractContext.startFingerprint(FingerprintElementType.GRAPHICDATA, fingerprintResult);
            extractContext.endFingerprint( );
        }
        extractContext.endEmbeddedContent( );
.
.
.
```

Figure 14:
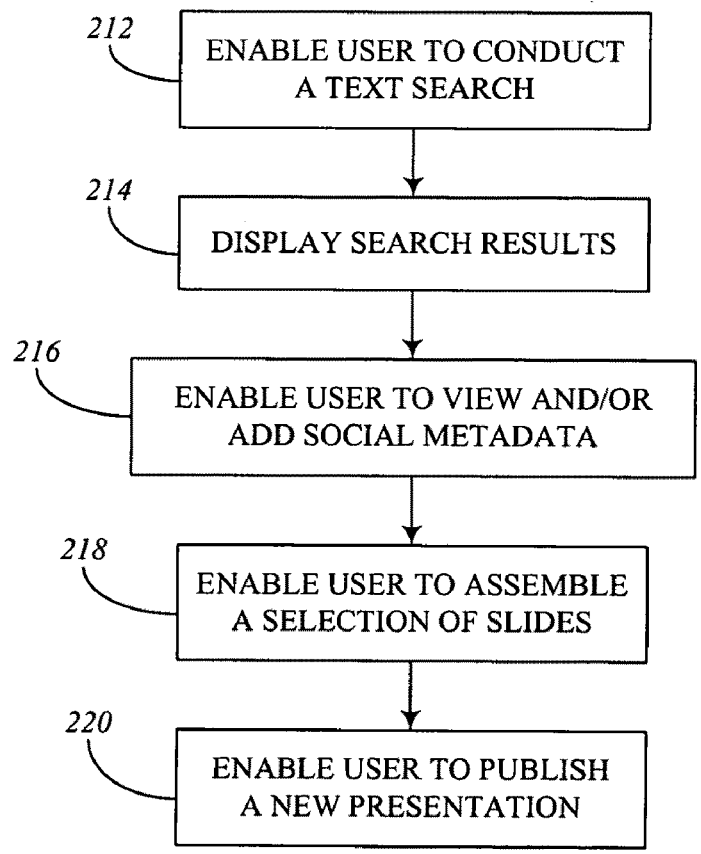
FIG. 14 is a flow diagram illustrating a method of an end-user device of a presentation content managing system, according to one embodiment.

FIG. 14 is a flow diagram illustrating an embodiment of a method of an end-user device of a slide presentation management system for enabling a user to manage slides. In this embodiment, the method includes enabling the user to conduct a text search, as indicated in block 212. In some cases, the search include searching for slides having the search terms within the body of the slide or within any portion of the slide. In other cases, the search may include searching for slides based on a match of the search terms with the tags associated with slide. Other embodiments may include a combination of these and/or other search techniques.

As indicated in block 214, the search results are displayed. As illustrated in FIGS. 7-12, the search results may be displayed in a carousel arrangement, showing one slide prominently and showing other slides in a background of the prominently displayed slide. By manipulating scrolling mechanisms, the user can scroll through the slides to see any desired slide in the prominent position of the carousel arrangement.

The method of FIG. 14 also includes enabling the user to view and/or add social metadata, which includes tags, comments, and/or ratings, as indicated in block 216. Block 218 indicates that the method further includes enabling the user to assemble a selection of slides. In some instances, the user may wish to download these selected slides, or even download an entire presentation. As indicated in block 220, the user is enabled to publish the new presentation onto one or more ESNs. Thus, after the new slide has been processed, as described with respect to the method of FIG. 13, other users can download the presentation published as described with respect to block 220 and/or search for one or more slides within the presentation. In this respect, the sharing, slide processing, and accepting functions can be repeated indefinitely by the users.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A non-transitory computer readable medium configured to store instructions that are executable by a processing device, the computer readable medium comprising:
    logic adapted to disassemble a plurality of slide presentations into a plurality of individual files, wherein each individual file corresponds to a single slide of a respective slide presentation and the plurality of slide presentations were previously uploaded;
    logic adapted to extract information from each slide; and
    logic adapted to compare the extracted information from each slide and consolidate groups of slides that are substantially similar, wherein the consolidating causes the group of slides to be considered a single slide when searching for uploaded slides;
    wherein the extracted information comprises creating a fingerprint for each slide, the fingerprint comprising at least one of: slide content, slide appearance, or graphic data.

2. The computer readable medium of claim 1, further comprising a database in which the individual files and extracted information are stored.

3. The computer readable medium of claim 1, wherein the processing device resides in a server of a presentation content managing system.

4. The computer readable medium of claim 1, further comprising logic adapted to conduct a text search from search terms supplied by an end-user device.

5. The computer readable medium of claim 4, wherein the logic adapted to conduct the text search is further adapted to match the search terms with text information extracted from each slide by the logic adapted to extract information.

6. The computer readable medium of claim 5, wherein the logic adapted to conduct the text search is further adapted to provide a single hit for each group of slides consolidated by the logic adapted to compare the extracted information.

7. The computer readable medium of claim 1, wherein the logic adapted to extract information from each slide is further configured to extract text information, embedded graphics information, shape attributes information, slide background information, master appearance information, formatting information, and appearance information from each slide.

8. The computer readable medium of claim 7, wherein the logic adapted to compare the extracted information is further configured to compare a slide content fingerprint of each slide, the slide content fingerprint including the text information and embedded graphics information of each slide.

9. The computer readable medium of claim 7, wherein the logic adapted to compare the extracted information is further configured to compare a slide appearance fingerprint of each slide, the slide appearance fingerprint including the text information, embedded graphics information, shape attributes information, slide background information, and master appearance information.

10. The computer readable medium of claim 7, wherein the logic adapted to compare the extracted information is further configured to compare a graphic data fingerprint of each slide, the graphic data fingerprint including the embedded graphics information, formatting information, and appearance information of each slide.

11. The computer readable medium of claim 1, wherein the logic adapted to extract information from each slide is further configured to create a thumbnail image and a higher resolution image of each slide.

12. The computer readable medium of claim 11, wherein the thumbnail images and higher resolution images are supplied to an end-user device for display on a graphical user interface.

13. The computer readable medium of claim 1, wherein the logic adapted to compare the extracted information can be adjusted to achieve any level of comparison.

14. The computer readable medium of claim 1, wherein the logic adapted to compare the extracted information is further adapted to consolidate the groups of slides by removing the slides that are duplicates or substantially similar.

15. A presentation content managing module executable by a server of a presentation content managing system, the presentation content managing module comprising:
    a database configured to store a plurality of slide presentations that were previously uploaded; and
    a slide disassembly module configured to perform a disassembly process on one or more of the slide presentations stored in the database, the disassembly process including splitting the slide presentation into multiple files, wherein each file represents a single slide;
    a slide fingerprinting module configured to extract text information and graphics information from each slide and store the text information and graphics information in the database, further comprising creating a fingerprint for each slide, the fingerprint comprising at least one of: slide content, slide appearance, or graphic data; and
    a de-duplication module configured to compare the fingerprint of each slide to group the slides that are at least substantially similar and consolidate the group of slides, wherein the consolidating causes the group of slides to be considered a single slide when searching for uploaded slides.

16. The presentation content managing module of claim 15, further comprising a user responsive module including a search engine configured to conduct a text search for matching search terms with the text information of the respective slides, the search terms supplied by a user of an end-user device of the presentation content managing system.

17. The presentation content managing module of claim 16, wherein the user responsive module further includes:
    a tag processing module configured to enable the user to view and add key words describing one of the slides revealed as a result of the text search;
    a comment processing module configured to enable the user to view and add comments on one of the slides revealed as a result of the text search; and
    a rating processing module configured to enable the user to view and add ratings on one of the slides revealed as a result of the text search.

18. The presentation content managing module of claim 16, wherein the user responsive module further includes:
- a slide folder configured to store a copy of a slide revealed as a result of the text search, the selected slide being selected by the user;
- a download processing module configured to download one or more slides from the slide folder to the end-user device.

19. The presentation content managing module of claim 15, further comprising an upload processing module configured to receive a new slide presentation from an end-user device of the presentation content managing system.

20. The presentation content managing module of claim 19, wherein the slide processing device is configured to process the new slide presentation uploaded by upload processing module.

21. A presentation content managing system comprising:
- a. a server having a processing device configured to manage presentation content;
and
- one or more end-user devices configured to upload slide presentations to the server via a network;
- wherein the server is configured to disassemble each slide presentation into a number of individual slides, perform a fingerprinting process on each individual slide to extract information from each slide, and perform a de-duplication process to consolidate slides that are substantially similar with respect to the information extracted from each slide, wherein the extracted information comprises creating a fingerprint for each slide, the fingerprint comprising at least one of: slide content, slide appearance, or graphic data;
- wherein the consolidating causes the group of slides to be considered a single slide when searching for uploaded slides.

22. The presentation content managing system of claim 21, wherein the presentation content managing system is an enterprise system.

23. The presentation content managing system of claim 22, wherein the network is a local area network.

24. The presentation content managing system of claim 21, further comprising a database configured to store the slide presentations, individual slides, extracted information, and information regarding the consolidation of substantially similar slides.

25. A computer implemented method comprising:
- disassembling a plurality of slide presentations into a plurality of individual files, one file for each slide of the slide presentation, wherein the plurality of slide presentations were previously uploaded;
- fingerprinting each slide to extract information of the respective slide, the extracted information comprising at least one of: slide content, slide appearance, or graphic data; and
- consolidating slides that are substantially similar with respect to the information extracted from each slide, wherein the consolidating causes the group of slides to be considered a single slide when searching for uploaded slides.

26. The computer implemented method of claim 25, wherein fingerprinting each slide further comprises extracting text information, slide formatting information, and embedded graphics information from each slide.

27. The computer implemented method of claim 25, wherein fingerprinting each slide further comprises creating a thumbnail image and a higher resolution image of each slide.

28. A slide processing module comprised of instructions stored on a non-transitory computer-readable medium and executed by a processor, the module comprising:
- means for disassembling a slide presentation into a plurality of files, each file representing a single slide;
- means for fingerprinting each slide to extract fingerprint information for each slide, the fingerprinting means including:
- means for extracting text from each slide; means for extracting slide formatting information from each slide;
- means for extracting embedded graphics information from each slide;
- means for creating a slide content fingerprint from the text extracted by the text extracting means;
- means for creating a slide appearance fingerprint from the text extracted by the text extracting means and embedded graphics information extracted from the embedded graphics extracting means; and
- means for creating a graphics data fingerprint from the text extracted by the text extracting means, embedded graphics information extracted from the embedded graphics extracting means, and slide formatting information extracted from the slide formatting extracting means;
- means for de-duplicating slides that are substantially similar based in part on a comparison of at least one of the slide content fingerprint, slide appearance fingerprint, and graphic data fingerprint of each slide.

29. The slide processing module of claim 28, wherein the fingerprinting means further comprises:
- means for creating a thumbnail image of each slide; and
- means for creating a higher resolution image of each slide.

* * * * *

UNITED STATES PATENT AND TRADEMARK OFFICE
CERTIFICATE OF CORRECTION

| | |
|---|---|
| PATENT NO. | : 8,341,528 B2 |
| APPLICATION NO. | : 12/494773 |
| DATED | : December 25, 2012 |
| INVENTOR(S) | : Chaudhary et al. |

It is certified that error appears in the above-identified patent and that said Letters Patent is hereby corrected as shown below:

In the Claims:

In column 25, line 19, in Claim 21, before "a" delete "a.".

Signed and Sealed this
Sixteenth Day of April, 2013

Teresa Stanek Rea
*Acting Director of the United States Patent and Trademark Office*